Figure 3:
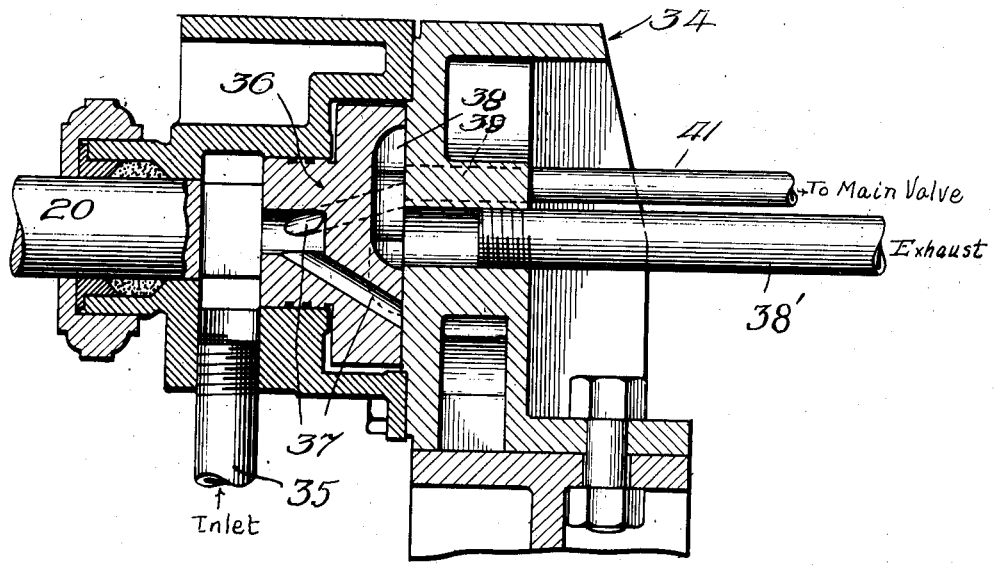

May 21, 1929.   R. L. BEERS   1,714,123
VALVE MECHANISM FOR STOKER RAMS AND THE LIKE
Filed Aug. 11, 1923   3 Sheets-Sheet 1
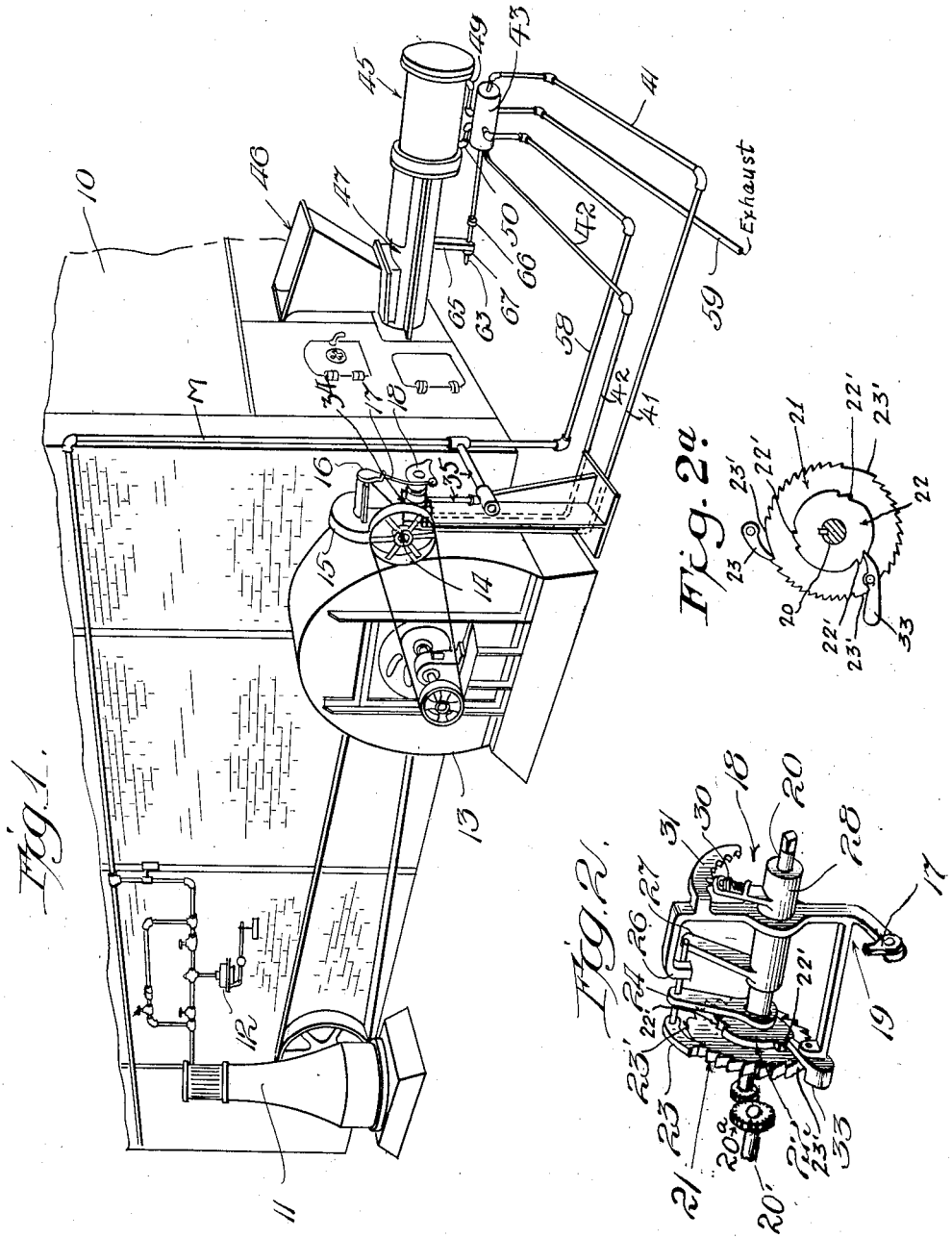
Witness:
Harry S. Gaither
Inventor:
Royce L. Beers
by Rector Hibben Davis & Macauley
Attys May 21, 1929.   R. L. BEERS   1,714,123
VALVE MECHANISM FOR STOKER RAMS AND THE LIKE
Filed Aug. 11, 1923   3 Sheets-Sheet 2

Inventor
Royce L. Beers

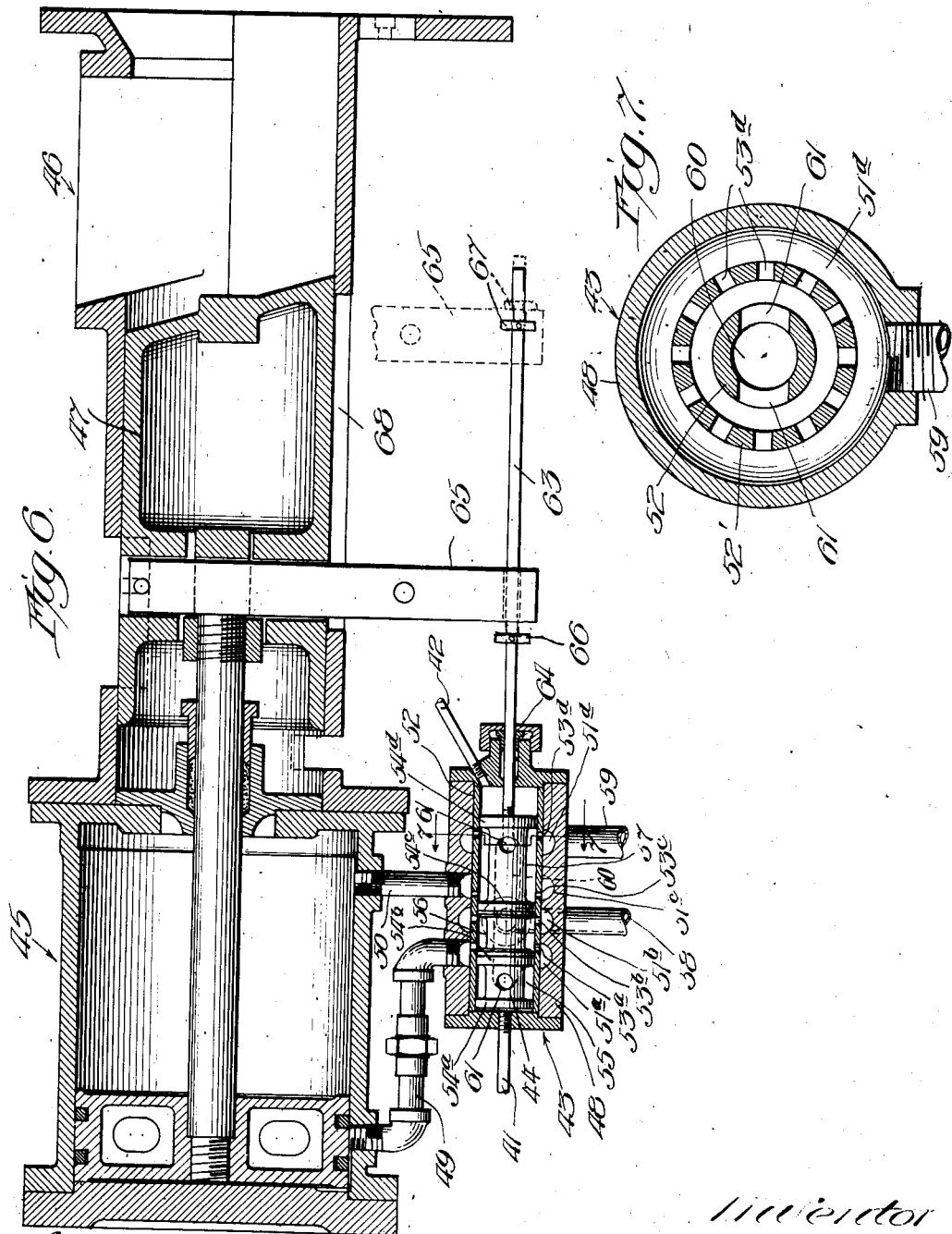

Patented May 21, 1929.

1,714,123

UNITED STATES PATENT OFFICE.

ROYCE L. BEERS, OF DETROIT, MICHIGAN, ASSIGNOR, BY MESNE ASSIGNMENTS, TO RILEY STOKER CORPORATION, OF WORCESTER, MASSACHUSETTS, A CORPORATION OF MASSACHUSETTS.

VALVE MECHANISM FOR STOKER RAMS AND THE LIKE.

Application filed August 11, 1923. Serial No. 656,979.

In underfeed stoker installations, where each ram (whether there be one or more) is singly to be operated by a reciprocating engine, it is known practice to supply the motivating fluid to the engine through a valve, the driving shaft for which is constantly running, but the periodicity of operation of which valve may be governed (as by ratchet mechanism) so that valve-operation occurs only once in a predetermined number of revolutions of the driving shaft. A structure suitable for such operation is shown in Roe Patent No. 951,340, and in the trade such a valve mechanism as therein shown, for the purpose stated, is known as a "Cole automatic" valve.

Efficacious though this utilization of Cole automatic valves in stoker practice has been, and advantageous in the resultant facility of control over the periodicity of operation of each ram individually, nevertheless these valving arrangements heretofore available are inherently objectionable in some features and are especially undesirable in some places of installation. In general, it is to the provision of improved means for supplying the motivating fluid to an engine, the periodicity of whose operation is to be controlled by suitable adjustable timing mechanism (of which the ratchet timing mechanism of a Cole automatic valve affords one practical and feasible illustration) that my present invention is addressed.

Some of the limitations and objections heretofore felt with respect to the commercial use of Cole automatic valves, but which are obviated by my present invention, are as follows: The valve proper of the "Cole automatic" must usually be placed at a considerable distance from the stoker cylinder, making necessary the provision of long piperuns from the valve to the engine cylinder and so causing excessive frictional loss in the pipe that leads the motivating fluid from the valve proper to the engine, and also causing an undesirable lag to occur between the action of the valve and the resultant action of the engine. Furthermore, steam-economy has been impossible because the maximum speed with which the timing mechanism could reasonably be operated necessarily left the cylinder in open communication with the steam supply pipe for an inordinately long period, all out of proportion to the time that it would take the piston to make an excursion along the cylinder. It is recognized as desirable to operate the timing or controlling mechanism at a slow rotative speed; also the desirability of prompt-cut-off for steam economy has long been obvious, but these two desiderata have heretofore been regarded as incompatible. Compromise has been necessary and neither desideratum has been fully attained in any construction of which I am aware.

Among the specific objects of my invention are these: (1) To provide fluid supply means that may be controllable as to periodicity of operation by simple timing mechanism, but wherein the motivating fluid supply may be sharply cut off at the point of cessation of effective work, thereby economizing on steam; (2) so to organize the apparatus that the motivating fluid may be valved to the engine cylinder very close to the engine, so effecting further steam economy, but at the same time allowing the timing mechanism which governs the periodicity of operation of the valve to be placed at any such distance from the engine as may be made desirable by other considerations in the design of the plant; (3) to enable the speed of operation of the steam cylinder and ram to be largely increased; (4) to enable the selective controlling mechanism or timing devices to be operated very slowly, yet with preservation of full economy of steam consumption; (5) to secure and preserve an operative proportionality between the fuel supply (effected by the ram) and the air supply for supporting combustion (effected by a blast fan or analogous means); and (6) to make the operation of the apparatus such that in case the ram is obstructed and stopped in its fuel-feeding stroke or on its return stroke, the cyclic operation of the ram may be continued to such a restricted extent as the position of the obstruction makes possible, rather than disabling the ram entirely.

For purposes of disclosure I have herein shown my invention as embodied in a single illustrated construction and applied to a single-retort stoker installation. Also I have shown the selective mechanism or timing means for determining periodicity of operation of the ram, as being of familiar construction heretofore employed in Cole automatic valves; but it will be understood that in these and other regards changes may be made in adapting the details of construction to other requirements for installation without departure from the spirit of my invention and within the scope of the appended claims.

Figure 5:
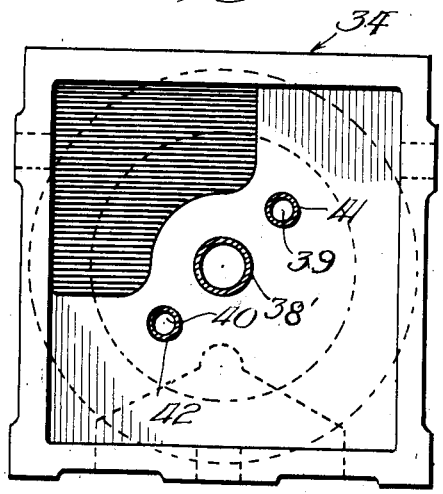
Figure 4:
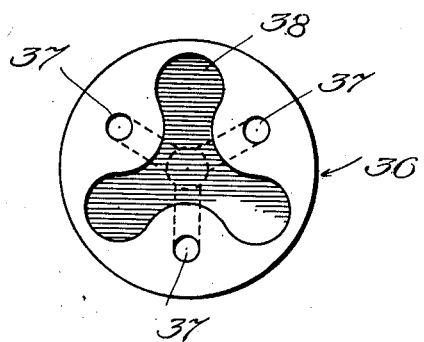

In the drawings, Fig. 1 is a schematic perspective view showing the application of my invention to the fuel-feeding means for an underfeed stoker which may be of the "lateral retort" type illustrated in Armstrong and Blackburn Patent No. 1,333,696, dated March 16, 1920; Fig. 2 is a purely diagrammatic representation of the timing ratchet-mechanism of a Cole automatic valve of known design; Fig. 2ª is a detail elevation of the ratchet and pawls of Fig. 2; Fig. 3 is a vertical sectional view through the valve proper directly operated by said ratchet mechanism for controlling the periodicity of operation of a pressure-actuated cut-off valve; Fig. 4 is an end elevation of the rotating member of the rotary valve which is operated by said ratchet mechanism; Fig. 5 is a side view of the stated valve mechanism; Fig. 6 is a vertical sectional view through a ram and a cut-off valve associated therewith; and Fig. 7 is a transverse section through the cut-off valve, taken on the line 7—7 of Fig. 6.

In known fashion, the steam pressure supply of the boiler that is served by the stoker may govern both the air supply to support combustion and the rate of operation of the drive shaft for the selectively-settable actuating mechanism of the periodicity-controlling valve. Thus, in Fig. 1, the steam boiler 10 supplies steam to the fan-engine 11 under control of a fan-engine regulator 12 which causes the engine to speed up as the boiler pressure goes down and vice versa, and this engine drives (at accordantly varying speeds) the blast fan 13 which supplies air under pressure to the stoker, the fan-shaft being used as a jack-shaft to drive (likewise at variable speeds) the pulley shaft 14 which actuates the valve-timing devices. Thus said pulley shaft 14 communicates power through gearing 15 to the crank 16, the link connection 17 of which oscillates the frame structure of the variably-settable periodicity-controlling mechanism, or timing mechanism, 18.

Preliminarily to specific description of the devices, it may be pointed out that the periodicity-controlling mechanism, 18 (Fig. 2) operates the movable or valving element of the valve structure 34 (Figs. 3, 4 and 5), but, that, instead of controlling directly and entirely the supply of motivating fluid to the ram-engine 45, as it does in the usual installation of a Cole automatic valve, this valve 34 is in the nature of a "pilot." It controls the steam supply to a main valve or cut-off valve 43, (Figs. 6 and 7) which in turn controls the supply of motivating fluid to said ram engine 45. This main valve 43 is placed very close to the ram engine, and its movable or valving parts may readily be made subject to mechanical actuation from the ram, so that this main valve may be subject to dual control, partly from the pilot valve and partly from the ram mechanism or, otherwise stated, the main valve is in part pressure-actuated by pressure controlled by the pilot valve, and in part is mechanically actuated by connections with the ram mechanism. It will be apparent, then, that by suitable construction and arrangement of these principal parts (about to be specifically described) the desiderata heretofore stated may be attained. The pilot valve 34 will have to handle only small quantities of motivating fluid requisite for pressure actuation of the main valve so it may be placed at a considerable distance from the main valve and the ram, and any slight steam-loss occasioned by the length of piping run between it and the main valve will be inconsequential in any event. This pilot valve, operated from the suitable timing mechanism 18, may solely determine the periodicity of operation of the main valve to cause the latter to admit steam to the ram engine 45, yet the main valve may be controlled mechanically from the ram engine itself to effect the cut-off just as soon as the ram makes a resultant excursion, so that no matter how slowly or how infrequently the pilot valve operates steam-loss will not be occasioned, as heretofore it has been, by maintenance of useless steam pressure in the ram cylinder for an inordinate length of time. Further, since steam boiler pressure governs the speed of the fan-engine 11, which runs both the fan and the timing mechanism for the pilot valve, and since the pilot valve, through its control over the main valve 43 determines the periodicity of operation of the stoker ram, desired coordination of rate of air supply and rate of fuel supply will be had.

Referring now to the specific devices and connections illustrated in the drawings for purposes of a single full disclosure, it will be understood that as far as is feasible the illustration has been made diagrammatic for the sake of simplicity. Especially this is true of the timing mechanism.

The timing mechanism 18 may take various suitable forms. That specially shown (and of character now well known in the art) comprises a frame 19 oscillatable by link 17 about a suitably-supported shaft 20 to which the two shaft-operating ratchets 21 and 22 are both fastened. The pawl 23 for the primary ratchet is carried on a loose pawl-carrier or arm 24 which is pivotally mounted on the shaft 20. This pawl-carrier 24 is acted on by two stops 26 and 27, which are carried in oscillation by the frame 19 and are selectively settable to vary the distance between them so as to vary the lost-motion of the frame with respect to said pawl-carrier. Obviously the pawl 23 may drive the ratchet 21 step-by-step, but with steps of variably-settable length according to this lost-motion adjustment or spacing between the two stops 26 and 27. The stop 27 is on a sleeve 28 which is loosely mounted on shaft 20 and also is rotatable with respect to the frame 19, while stop 26 is rigid with the frame 19. A spring latch 30 on the sleeve 28 acts against a latching segment 31 carried by the frame 19 to fix the two stops in selectively-variable spaced relation. The pawl 33 for the second ratchet 22 may be directly carried by the frame for its action is invariable. Primary pawl 23 will move the ratchet wheel 21 through a suitable angle of rotation but then comes to a stripped spot 23' on the periphery of the ratchet. At this point the secondary ratchet and pawl come into action. At a suitable point 22' the wheel 22 has two teeth, spaced accordantly with the angular extent of full-stroke movement from the frame 19. By the resultant two full steps of the shaft 20 the primary ratchet wheel 21 has its stripped spot 23' moved past the pawl 23 so that the main ratchet and pawl may again take up their operation. The valve mechanism operated by the shaft 20 is so arranged that its port-opening and port-closing movements are effected by pawl 33. The first full-stroke movement occasioned by pawl 33 will fully open a valve-port, and the second full-stroke operation will fully close that port. It is the interval between such valve operations that depends on the variable operation of pawl 23. In Figure 2 the main ratchet wheel 21 is shown as having three stripped spots and the secondary ratchet as having three pairs of teeth, the shaft 20 being diagrammatically shown as driving the valve shaft 20' one-to-two through gearing 20$^a$. This arrangement is one which will accommodate a rotary reversing valve 34 which will make three complete reversals of steam-connections in a single rotation of the valve shaft 20'.

The valve structure 34 has a steam-supply connection 35 to the steam main M. The rotary valve head or valve proper, 36, driven by the timer-shaft 20' has three passages 37 in constant communication with the supply pipe 35 and a three-lobed exhaust chamber 38 constantly communicating with an exhaust pipe 38'. When any supply passage 37 communicates with port 39 of the valve chamber, a lobe of the exhaust passage 38 communicates with a diametrically opposite port 40 of the valve-casing, and vice versa. The valve may therefore make three complete reversals in one rotation.

The ports 39 and 40 of the rotary reversing valve or pilot valve are connected by respective pipes 41 and 42 with the opposite ends of the cylindrical casing of the main valve or cut-off valve 43 that governs the admission of steam to, and the cutting off of the steam supply from, the cylinder of the ram engine 45 by which fuel is fed from the supply hopper 46 into the stoker by means of the ram generally indicated at 47. The sliding piston 44 within the casing 48 of this main valve will be driven to the position shown in Fig. 6 whenever the reversing valve of pilot valve 34 admits steam to pipe 42, and will be driven to the other end of its casing when said pilot valve admits steam to pipe 41. The power necessary for this pressure-responsive movement of the light valve-piston 44 is very small, and consequently the piping connections for it may be of very small size with consequent saving of expense.

This piston 44 is the movable valving element by which the supply of motivating fluid to the ram-cylinder is controlled. Passages 49 and 50, shown as pipes, connect suitable ports of the valve casing with opposite ends of the ram-engine cylinder. A supply pipe 58, connected with the steam main, may be put into communication with either of the pipes 49 and 50, while the remaining pipe will simultaneously be put in communication with an exhaust pipe 59 leading to any suitable point of exhaust-steam delivery. Of course the valve structure should accommodate this reversal, and the valving element of piston 44 should further be capable of cutting off the steam supply to the ram cylinder when in position about midway between its terminal position, and while the valving element will be pressure moved to its terminal position, wherein it will supply steam to one end or the other of the ram engine, only in response to operation of the pilot valve, it is to move this valving element to an intermediate cut-off position that I provide for its mechanical connection with the ram devices as hereafter to be described.

In the form of embodiment of the main valve structure shown in Figs. 6 and 7, the interior wall of the casing 48 is provided with four annular grooves 51$^a$, 51$^b$, 51$^c$, and 51$^d$, into which open, respectively, the pipes 49, 58, 50 and 59. Fitting tightly within the casing 48 and closed at its ends by the heads of the casing is a sleeve 52 provided with four annular rows of ports 53$^a$, 53$^b$, 53$^c$ and 53$^d$ which open to the grooves 51$^a$—51$^d$, respectively. The piston 44 reciprocates within this sleeve or interior wall of the cylinder. The slender body of this piston has terminal heads 54$^a$ and 54$^d$, and between these two are two annular flanges 54$^b$ and 54$^c$, so forming in effect three circumferential grooves, 55, 56 and 57. The body of the valve has an axial bore 60 through the central part of its length, which bore opens, at orifices 61, 61, to the respective grooves 55 and 57. The middle groove always communicates with the steam supply pipe 58, and at the opposite extremes of piston travel will communicate either with ports 53ª or ports 53ᶜ, so supplying the steam to one end or the other of the ram-engine cylinder. In mid-position of the piston, however, the flanges 54ᵇ and 54ᶜ will cut off, or close, both sets of ports 53ª and 53ᶜ. The groove 57 (with which the groove 55 is always in open communication through the body-passage 60) is constantly in register with the ports 53ᵈ for the exhaust pipe 59, but it will be observed that pipe 50 of the ram engine cylinder will communicate with the exhaust pipe 59 only when the parts are in position shown in Fig. 6, while pipe 49 will have such communication with the exhaust pipe 59 only when the main valve is moved to the opposite end of its cylinder.

Obviously, whenever the pilot valve 34 supplies steam to the pipe 42, the main valve element 44 will move to the position shown in Fig. 6, and momentarily the parts stand in the position shown. But under these conditions steam supply pipe 58 communicates through the main valve with the pipe leading to the head end of the ram engine 45, so the piston of the latter immediately begins its excursion toward the opposite or ram-end. Arriving at the opposite end of its travel, the ram engine piston would reside there until a reversal of the pilot valve 35 should cause a reversal of the position of the main valve element 44 and a consequent supply of steam to the pipe 50 to drive the engine piston back to initial position. During each such a dwell of the ram engine piston in terminal position, steam would be wastefully supplied to and build up unnecessary pressure in the ram engine cylinder were not the main valve member 44 moved to cut-off position by suitable means, one embodiment of which I will now describe.

The valving piston 44 has a piston rod 63 extending through the gland 64 and passing loosely through an opening in the lower end of arm 65 carried by the ram 47, the casing of which is appropriately slotted as at 68 to receive the arm. Two stops 66 and 67 are adjustably secured to the rod 63 as by set-screws and are spaced apart approximately the full length of the ram-excursion, and in such position on the rod 63 that (were the valve member 44 not otherwise moved) reciprocation of the ram through full stroke would leave the valve piston 44 standing with its two flanges 54ᵇ and 54ᶜ covering the two rows of ports 53ª and 53ᶜ.

Now, the full operation of the device will be apparent: Referring particularly to Figs. 6 and 1, the pilot valve 34 has connected pipe 42 of the main valve with the steam supply pipe 35, and pipe 41 of said main valve with the exhaust connection 38′ (Fig. 3). Consequently the piston 44 of the main valve structure 43 is moved to its extreme position as shown in Fig. 6, opening the steam supply pipe 58 to the head end of the ram engine cylinder 45 and opening the ram-ward end of said engine cylinder to the exhaust pipe 59. Now the ram engine piston will move to the right in Fig. 6, and just before it completes its full excursion the arm 65 will strike stop 67 on the piston rod 63, mechanically moving the valving element 44 of the main valve to a mid-position where its two flanges 54ᵇ and 54ᶜ cut off both rows of ports 53ª and 53ᶜ, for steam economy. In such relation the parts will remain until the pilot valve 34 reverses the connections first described, supplying steam to the main valve through pipe 41. Thereupon the valving element 44 of the main valve will complete its excursion toward the right, Fig. 6, reversing the connections of the ram-engine cylinder from those last above described and occasioning return travel of the ram-engine piston. In this return stroke arm 65 strikes the stop 66, mechanically moving the valving element 44 of the main valve to mid-position again, for cut-off purposes. Should the ram strike a jamming obstruction that prevents it from making its full stroke without, however, wholly closing the fuel passage, the ram will work through its thus-shortened stroke-range. On the feed-stroke it cannot reach a position where its arm 65 will move the main valve to cut off the steam supply, so the engine stands idle under full steam-pressure until the pilot-valve reverses the steam-connections for the main valve. Then the engine will make its return stroke. Although somewhat steam-wasteful, this partial feed will nevertheless minimize, to the stoker being served, the dangers of injury that arise from total failure of fuel supply.

It will be apparent that the construction shown attains the desiderata hereinbefore referred to, and provides simple and advantagous mechanisms to such end; but it will be understood by those skilled in the art that in its broader aspects my invention is not limited to the specific construction and arrangement of parts herein shown for illustrative purposes, and that many changes may be made without departure from the spirit of my invention within the scope of the appended claims.

I claim:

1. The combination with a stoker ram and its reciprocating engine, of fluid supply connections for the engine to motivate it, a main valve operable at stroke-end of the engine-operation to cut off said fluid supply connections and leave the engine inert pending movement of said valve to open said fluid supply connections; selectively-settable timing means for arbitrary predetermination of the periodicity of engine-operation; and means operated by said timing means for operating said main valve to open said fluid supply connections.

2. The combination with a stoker ram and its reciprocating engine, of fluid supply connections for said engine including a main valve operable from said engine at its stroke-end to close said fluid supply connections and leave said engine inert pending movement of said valve to open said connections; means controlling the operation of said valve to move it from connections-closing to connections-opening position; and a selectively-settable timing mechanism for arbitrarily predetermining the periodicity of engine-operation and operatively connected with and controlling the last said means.

3. The combination with a stoker having a ram, a reciprocating engine for the ram, and a boiler served by said stoker, of steam supply connections from said boiler to said engine, a main valve controlling said connection and operable by the engine to cut off or close said connection, said valve being operable by pressure application to open said connection, piping from said boiler to said valve for pressure-actuation of the latter, a pilot valve controlling said connection, selectively settable timing mechanism for actuating said pilot valve, and means for operating said timing mechanism at speeds variable with boiler-pressure variation.

4. The combination with a stoker ram and reciprocating engine therefor, of fluid supply connections for the engine, a main valve adapted to be pressure moved to admit fluid to the engine, engine-operated means for moving said valve to close said fluid supply connection, pressure supplying connections for the main valve to actuate the latter to open it, a pilot valve controlling said pressure supplying connections, and selectively settable timing mechanism for actuating said pilot valve with varying periodicity.

5. The combination with a stoker ram and reciprocating engine therefor, of fluid supply connections for the engine, a main valve operatively associated with said connections and adapted to be pressure moved to admit fluid to the engine, engine-operated means for moving said valve at engine-stroke-end to close said fluid supply connections, said main valve including a reciprocating piston constructed and arranged for pressure-balance when in position to close said supply connections, thereby to remain in closing position; connections for supplying pressure to the main valve to actuate the latter and move it to connection opening position; a pilot-valve controlling the last said pressure supplying connection; and selectively-settable timing mechanism for actuating said pilot valve with varying and predetermined periodicity.

6. The combination with a stoker ram and reciprocating engine therefor, of connections for supplying motivating fluid to the engine, a main valve controlling said connections and adapted to be pressure moved to open the same to admit fluid to the engine; engine-operated means for moving said valve to close said fluid supply connections and render said engine inert pending pressure-actuated operation of said valve to open said connections; connections for supplying pressure to the main valve to actuate the latter to open it; a rotary connection-reversing pilot valve for alternately opening the last said connection to opposite ends of the main valve; and means for actuating said pilot valve with varying periodicity comprising timing mechanism for driving said rotary valve, including ratchet and pawl mechanism variably settable as to length of throw.

7. The combination with a stoker ram and reciprocating engine therefor, of connections to supply motivating fluid to opposite ends of said engine; a reciprocable piston valve controlling said connections and arranged close to said engine; mechanical connections between said engine and valve whereby said engine at each stroke-end moves said valve to cut-off position to render said engine inert pending pressure-actuation of said valve to open said motivating fluid connection; connections for supplying actuating pressure to opposite ends of the main valve to actuate the latter in either direction to open it; a rotary, connection-reversing pilot valve governing the last said connections for alternately supplying pressure to opposite ends of said piston valve, and means independent of said engine for operating said rotary pilot valve.

8. The combination with a stoker ram and its reciprocating engine, of fluid-supply connections for the engine, a main valve arranged close to the engine and controlling said fluid supply connections for economy in steam consumption and for speed of response of the engine to the actions of the valve, said main valve being adapted to be pressure-moved to admit fluid to the engine through said connections; means for actuating said valve to cut off the fluid supply at the end of each engine-stroke thereby to render the engine inert pending pressure-actuation of said main valve; connections for supplying actuating pressure to opposite ends of said main valve; a connection-reversing pilot valve relatively remote from said main valve controlling said pressure-supply connections for the main valve; and means independent of the engine for operating said pilot valve.

9. The combination with a stoker ram and its reciprocating engine, of fluid-supply connections for the engine, a main valve arranged close to the engine and controlling said fluid supply connections for economy in steam consumption and for speed of response of the engine to the actions of the valve, said main valve being adapted to be pressure-moved to admit fluid to the engine through said connections; means for actuating said valve to cut off the fluid supply at the end of each engine-stroke thereby to render the engine inert pending pressure-actuation of said main valve; connections for supplying actuating pressure to opposite ends of said main valve; a connection-reversing pilot valve relatively remote from said main valve controlling said pressure-supply connections for the main valve; and means independent of said engine for operating said pilot valve and comprising a movable part and means for varying the number of operations of said part requisite to effect pilot-valve reversal and thereby to vary the period during which said main valve will remain in cut-off position.

10. The combination with a stoker ram and a reciprocating engine therefor, of fluid supply connections for said engine, a pressure-responsive reciprocating valve having provision for opening the supply connections to said ram engine at opposite ends of the valve-stroke and for closing said supply connections when the valve is intermediate the ends of its stroke, mechanical connection between said valve and the ram-engine for moving said valve to mid-position as the ram-engine piston approaches the end of its stroke, pressure-supply connections to the main valve for actuating the latter, a connection-reversing valve controlling the last said connection, adjustable timing mechanism for determining the periodicity of operation of said reversing valve, and a source of pressure supply for said connections to the ram-engine and said connections to the main valve.

ROYCE L. BEERS.